(12) United States Patent
Elazary et al.

(10) Patent No.: US 10,949,797 B2
(45) Date of Patent: Mar. 16, 2021

(54) INVENTORY MANAGEMENT ROBOTS

(71) Applicant: inVia Robotics, Inc., Agoura Hills, CA (US)

(72) Inventors: Lior Elazary, Agoura Hills, CA (US); Randolph Charles Voorhies, Culver City, CA (US); Daniel Frank Parks, II, Los Angeles, CA (US)

(73) Assignee: inVia Robotics, Inc., Westlake Village, CA (US)

( * ) Notice: Subject to any disclaimer, the term of this patent is extended or adjusted under 35 U.S.C. 154(b) by 765 days.

(21) Appl. No.: 15/201,216

(22) Filed: Jul. 1, 2016

(65) Prior Publication Data
US 2018/0005173 A1 Jan. 4, 2018

(51) Int. Cl.
*G06Q 10/08* (2012.01)
*G06Q 30/06* (2012.01)
*G06Q 30/02* (2012.01)

(52) U.S. Cl.
CPC ....... *G06Q 10/087* (2013.01); *G06Q 30/0202* (2013.01); *G06Q 30/06* (2013.01)

(58) Field of Classification Search
CPC ... G06Q 10/087; G06Q 30/06; G06Q 30/0639
See application file for complete search history.

(56) References Cited

U.S. PATENT DOCUMENTS

| | | | |
|---|---|---|---|
| 6,970,802 B2 * | 11/2005 | Ban | B25J 9/1641 700/59 |
| 7,277,187 B2 * | 10/2007 | Smith | G01B 11/00 340/928 |
| 7,792,711 B2 * | 9/2010 | Swafford, Jr. | A47F 1/126 705/22 |
| 8,892,240 B1 * | 11/2014 | Vliet | B65B 59/00 700/213 |
| 9,367,831 B1 * | 6/2016 | Besehanic | G06Q 10/087 |

(Continued)

OTHER PUBLICATIONS

Zhang, Jian, et al. "Mobile robot for retail inventory using RFID." 2016 IEEE international conference on Industrial technology (ICIT). IEEE, 2016.*

(Continued)

*Primary Examiner* — Asfand M Sheikh
(74) *Attorney, Agent, or Firm* — Ansari Katiraei LLP; Arman Katiraei; Sadiq Ansari

(57) ABSTRACT

Provided are robots for managing inventory of arbitrary size, shape, weighted, or other distinct featured items. The robots dynamically and adaptively manage inventory for items stacked atop one another, items stacked behind one another, items that are horizontally arranged, items that are dispensed from a gravity flow dispenser, items that are dispensed from a back-to-front push dispenser, and items that are loosely contained within a bin. The robots have a sensory array from which dimensions of a particular arrangement and dimensions of a particular item in the particular arrangement can be calculated. The calculated dimensions can include length, width, or height of a particular arrangement and a particular item or force imposed by the particular arrangement and mass of the particular item. Based on these dimensions, the robots can dynamically track different item inventories without counting each individual item.

20 Claims, 15 Drawing Sheets

(56) References Cited

U.S. PATENT DOCUMENTS

| | | | | |
|---|---|---|---|---|
| 9,996,818 | B1* | 6/2018 | Ren | G06F 16/5866 |
| 10,157,452 | B1* | 12/2018 | Tighe | G06K 9/00771 |
| 10,169,677 | B1* | 1/2019 | Ren | G06K 9/6212 |
| 10,311,634 | B2* | 6/2019 | Houghton | H04N 13/243 |
| 10,769,582 | B2* | 9/2020 | Williams | G06K 9/00771 |
| 2001/0056313 | A1* | 12/2001 | Osborne, Jr. | A47G 21/08 |
| | | | | 700/245 |
| 2010/0017407 | A1* | 1/2010 | Beniyama | G06K 9/00201 |
| | | | | 707/E17.016 |
| 2010/0169189 | A1* | 7/2010 | Allison | G06Q 10/087 |
| | | | | 705/28 |
| 2015/0052029 | A1* | 2/2015 | Wu | G06Q 10/087 |
| | | | | 705/28 |
| 2015/0248578 | A1* | 9/2015 | Utsumi | G06K 9/00201 |
| | | | | 382/154 |
| 2016/0271800 | A1* | 9/2016 | Stubbs | B25J 9/1666 |
| 2017/0018094 | A1* | 1/2017 | Todeschini | G01B 11/00 |
| 2017/0147966 | A1* | 5/2017 | Aversa | G06Q 10/087 |

OTHER PUBLICATIONS

Verma, Nishchal K., et al. "Object identification for inventory management using convolutional neural network." 2016 IEEE Applied Imagery Pattern Recognition Workshop (AIPR). IEEE, 2016.*

Kejriwal, Nishant, Sourav Garg, and Swagat Kumar. "Product counting using images with application to robot-based retail stock assessment." 2015 IEEE international conference on technologies for practical robot applications (TePRA). IEEE, 2015.*

* cited by examiner

INVENTORY MANAGEMENT ROBOTS

BACKGROUND INFORMATION

Inventory management is important for running a successful business. Too little inventory can result in lost revenue because of lost sales and lost customers. Too much inventory can result in wasted capital expenditure to not only acquire the excess the inventory, but also store the inventory for extended periods. The capital is further wasted if the obtained inventory does not sell.

In a large warehouse with several thousand items, manual inventory tracking is impractical and inaccurate. For these and other reasons, businesses spend significant amounts of time and money to install dedicated inventory management systems to automatically track and manage inventory.

While accurate for inventory tracking, these prior art systems are often custom configured for a specific set of items. As items are swapped out and replaced with items of different shapes, sizes, weights, or other features, the systems need to be reconfigured to track and manage the new items. The reconfiguration is itself time consuming and expensive, making these system difficult to adapt.

Prior art inventory management systems may also require items to have static placement in a warehouse. In such systems, sensors or scanners are positioned adjacent to the location where a particular item is stored. Each sensor then keeps track of the number of times the particular item is added or removed from the corresponding location. In order to alter the position of the item, one would have to change the sensor position or map the current inventory count of the item to another sensor at the new item location. The static placement makes it difficult to optimize the warehouse based on shifting item demand.

Some prior art inventory management systems track inventory based on a prior state. Such systems are initially configured with item quantities. The systems then adjust this baseline reference by tracking item additions and removals. If the system improperly detects an addition or removal at any point in time, the tracking accuracy may be compromised thereafter. Accordingly, some prior art systems are unable to perform inventory management dynamically.

Another shortcoming of prior art inventory management systems is that they are not adaptive. The sensors are configured to track inventory according to a particular arrangement. For instance, a sensor may be used to track inventory counts for items that are stacked atop one another. This same sensor cannot be used to track inventory counts for items that are horizontally arranged, arranged front-to-back, or are contained and dispensed from a dispenser or bin. Different sensors are needed for each arrangement. This adds expense and complexity to the system and further limits the warehouse to static item placement.

For at least these reasons there is a need for a more robust inventory management system. There is a need for a system that can track inventory dynamically and adaptively. With respect to dynamic tracking, there is a need for a system that can determine inventory counts without reliance on a prior state. Furthermore, there is a need for the system to track inventory without static positions in order to allow item placement to be optimized relative to demand. With respect to adaptive tracking, there is a need for a system that can track different items regardless of the arrangement of the items. In other words, the same system should be able to track items that are stacked atop one another, dispensed from a gravity flow dispenser, stacked horizontally, stored in a bin, etc.

BRIEF DESCRIPTION OF THE DRAWINGS

A preferred embodiment for inventory management robots will now be described, by way of example only, with reference to the accompanying drawings in which.

DETAILED DESCRIPTION OF PREFERRED EMBODIMENTS

Figure 1:
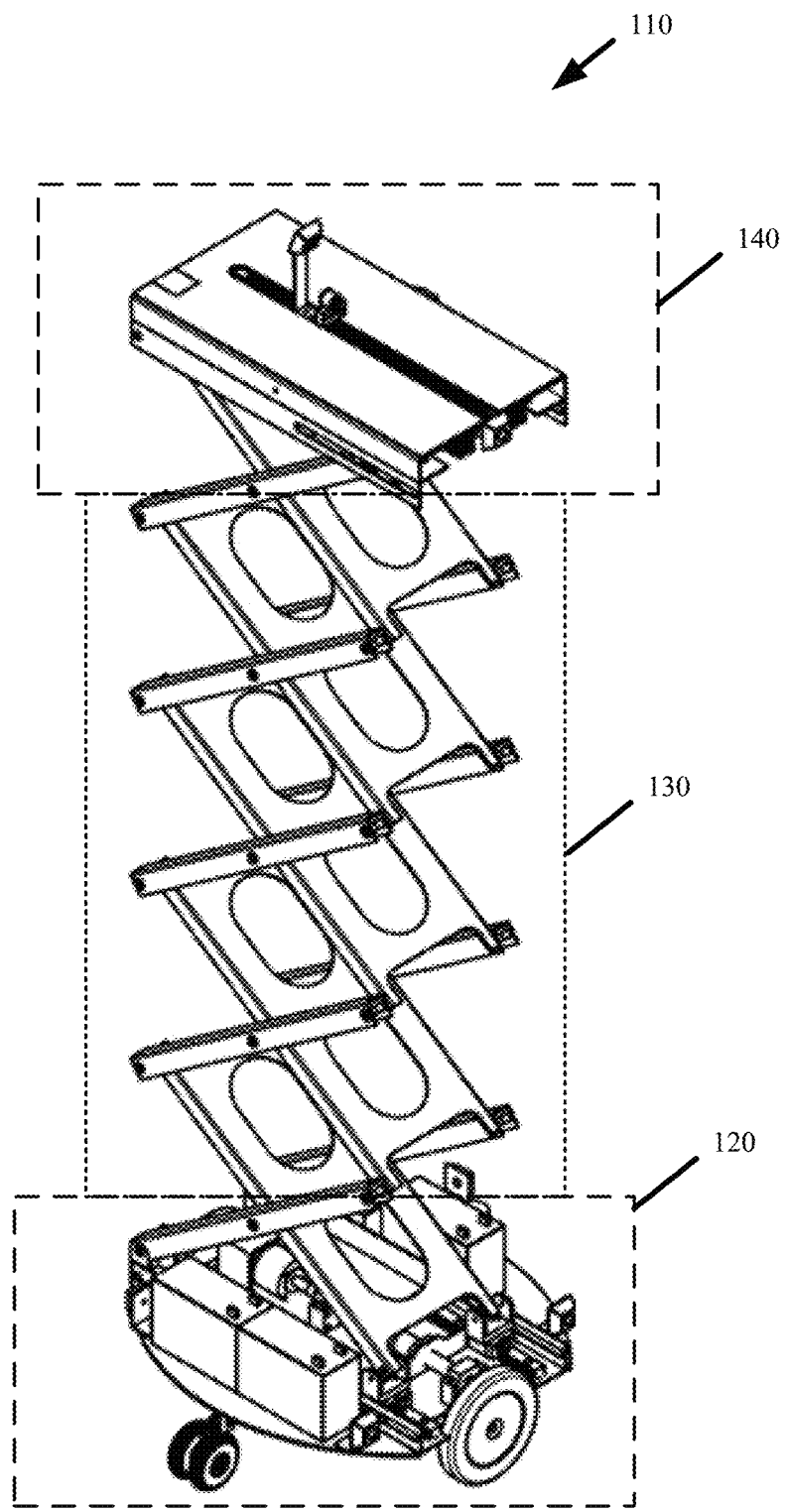
FIG. 1 illustrates an exemplary inventory management robot in accordance with some embodiments.

In the following detailed description, numerous details, examples, and embodiments are set forth and described. As one skilled in the art would understand in light of the present description, the system and methods are not limited to the embodiments set forth, and the system and methods may be practiced without some of the specific details and examples discussed. Also, reference is made to accompanying figures, which illustrate specific embodiments for inventory management robots. It is to be understood that other embodiments can be used and structural changes can be made without departing from the scope of the embodiments herein described.

The embodiments provide inventory management robots. The robots are fully or semi autonomous machines for dynamically and adaptively managing inventory within a distribution site or warehouse. The robots manage inventory for arbitrary sized, shaped, weighted, or other distinct featured items in the distribution site. The robots manage inventory for such items regardless of item positioning or item arrangement in the distribution site. In other words, the same robot can manage inventory for items stacked atop one another, items stacked behind one another, items horizontally arranged, items that are dispensed from a gravity flow dispenser, items that are dispensed from a back-to-front push dispenser, and items that are loosely contained within a bin as some examples. Moreover, the robots manage inventory without relying on prior inventory states or inventory counts.

Inventory management involves tracking a count or present stock of items. The robots determine inventory directly from a current scan and analysis of the items before them using different techniques that can account for differences in item features, item placement, and item arrangement.

Inventory management further involves tracking item distribution as items are retrieved from the distribution site. This is particularly important for items that may be recalled. Even though the same item may be distributed in different orders, different item lots may contain variances. Different lots for the same item can represent different manufacturers or plants of the same manufacturer that produce the same item, the same manufacturer producing the same item at different times, or one or more manufacturers that produce the same item with components that are sourced from different vendors. In such cases, the robots track item distribution by associating the individual item lot as well as any other identifying information with different orders as the items are retrieved or orders are fulfilled using the robots.

Inventory management can further involve automatically replenishing depleted inventories. The replenishing can occur dynamically and intelligently. In some such embodiments, the robots replenish inventory based on remaining inventory that is dynamically and adaptively tracked according to the embodiments set forth herein, from a rate at which the inventory management robots detect the items being depleted, and also predictive factors.

Depending on the number of items within the distribution site and the distribution site size, a single robot or two or more robots operating in collaboration can perform the inventory management. The inventory management robots can also perform other tasks simultaneously with inventory management or when they are not needed for inventory management. For instance, the robots simultaneously perform inventory management as they go about retrieving items for order fulfillment. Alternatively, the robots can perform inventory management during off or closed business hours and perform item retrieval and order fulfillment during regular business hours.

The inventory management robots have locomotion allowing them to move freely in three dimensions within a distribution site or warehouse. In some embodiments, the locomotion is provided by a set of wheels, a lift, one or more motors for the wheels and lift, and a power source. In some other embodiments, the locomotion is provided by propellers, a motor, and a power source. The locomotion further involves a retrieval arm with which the robots of some embodiments retrieve or reposition items.

The robots are also configured with a sensory array. The sensory array can include one or more cameras, lasers, LiDAR, structured light (active stereo) sensors, passive stereo sensors, scanners, infrared sensors, acoustic sensors, radio beacon receivers, or some combination thereof. The sensory array provides the input that controls the robot movements in the distribution site and that guides the robot to a desired location. The sensory array input facilitates item recognition. Item recognition is used in some embodiments to determine if the robot has reached an intended location and also to differentiate items at that location for inventory management purposes. The sensory array also provides the input for the different dynamic and adaptive inventory management performed by the robots as described below.

FIG. 1 illustrates an exemplary inventory management robot in accordance with some embodiments. The robot 110 includes a motorized base 120 and an extendible lift 130 with a platform 140 located atop the lift 130. The platform 140 includes a retrieval arm for interacting with and engaging items. The sensory array, including cameras, lasers, scanners, and other sensors are distributed about the base 120, platform 140, and retrieval arm. Although not shown, the robot further includes motors and a power source for moving the robot. A processor controls the movements based on sensory array input. The processor also performs dynamic and adaptive inventory management based on sensory array input as described below. In some embodiments, the robot further includes network connectivity by way of a wireless transceiver and receiver. The network connectivity allows robots to communicate with one another as well as communicate with a database or central inventory administrative server.

This is simply one implementation of an inventory management robot. The embodiments can be adapted for implementation on a variety of robots including robots of different shapes, sizes, structures, functionality, mechanical mechanisms, sensors, etc. More generally, the embodiments can be implemented with any robot having a three dimensional mobility and a sensory array.

The three dimensional robot mobility combined with the robot's sensory array implement the different embodiments for dynamically and adaptively managing inventory involving different items, different item placements, and different item arrangements. The figures below illustrate these different dynamic and adaptive inventory management embodiments.

Figure 2:
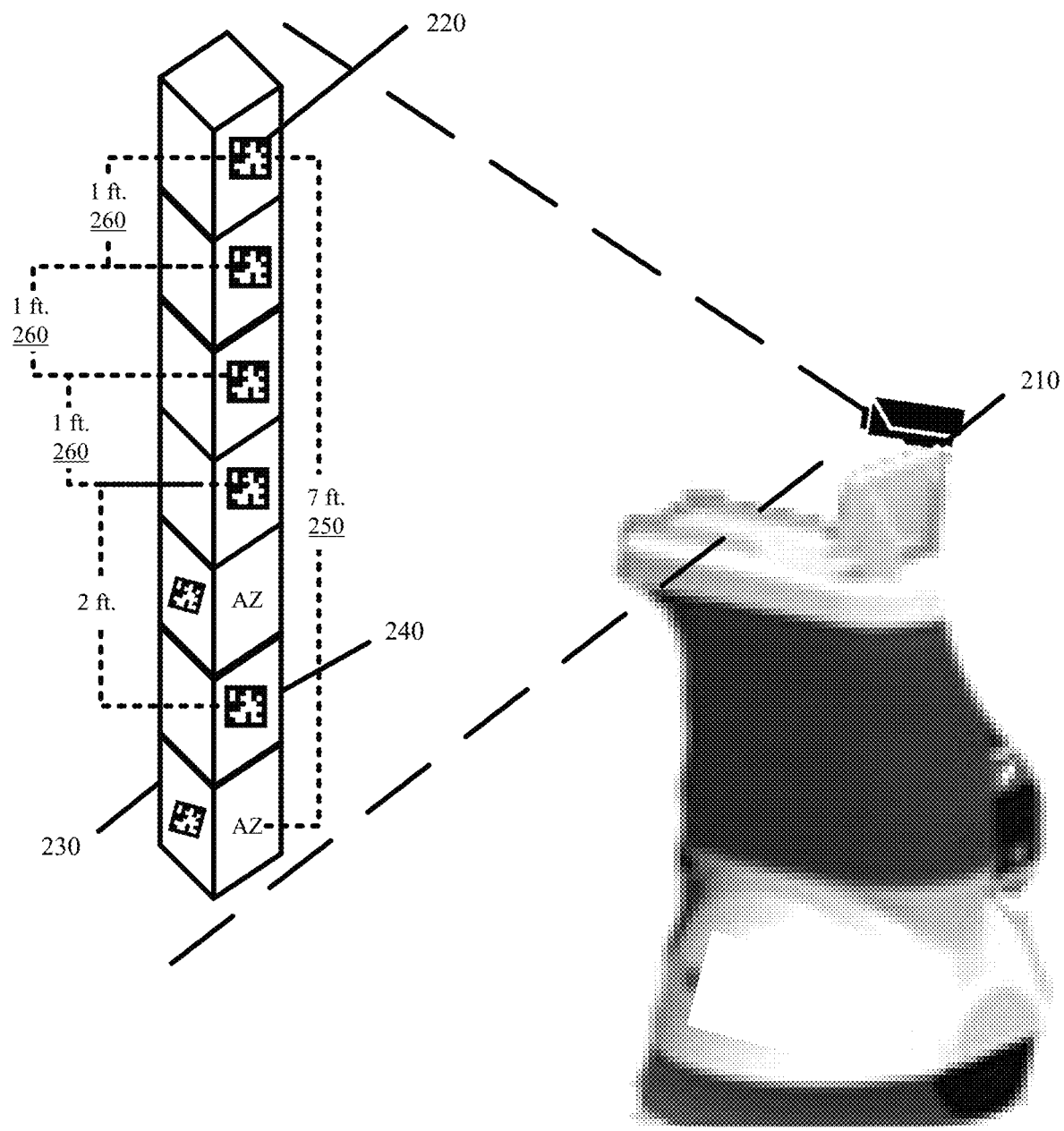
FIG. 2 illustrates dynamic and adaptive robot inventory management for items stacked atop one another in accordance with some embodiments.

In accordance with some embodiments, FIG. 2 illustrates dynamic and adaptive robot inventory management for items stacked atop one another. In this figure, the robot 210 dynamically determines item inventory based on a repeating feature 220 found within the item stack.

The robot 210 moves to position itself so that the entire stack of items appears within the robot 210 camera's field of view. The robot 210 takes an image or scan of the stack using its sensory array. The robot 210 then processes the image or scan to dynamically manage stack inventory.

As shown, image processing includes decomposing the image and performing feature matching to find one or more repeating features 220 appearing within the image. Preferably, the repeating feature 220 is a Universal Product Code (UPC), serial number, or bar code, although the repeating feature 220 can be any distinguishable item marking, shape, coloring, other identifier, or any combination thereof. It should be noted that the image processing performed in FIG. 2 and in subsequent embodiments described below accounts for and corrects any item distortions caused by the item's distance or orientation from the robot's cameras or scanners.

The robot 210 can count the number of times the repeating feature 220 is found in the stack image. The image processing and feature counting can be efficiently performed with the robot processor.

The resulting count may however be unreliable when there is variance in the orientation of the items in the stack. The repeating feature 220 does not appear for some items that are orientated differently than other items in the stack. As shown in FIG. 2, the first stacked item 230 has a different side facing the robot than the second stacked item 240, with the sides having different appearances. The robot therefore detects the differing item orientation by detecting that each instance of the repeating feature is not equidistant from the next in the stack. In such cases, image processing further involves computing the stack height 250 relative to the minimum distance 260 between the repeating feature 220 in the image. Mathematical transforms or other computations can be used to deduce the height and distance from the image. The robot 210 divides the total height 250 by the minimum distance 260 in order to obtain the number of items in the stack. The result accurately and dynamically provides the robot 210 with the inventory count.

Figure 3:
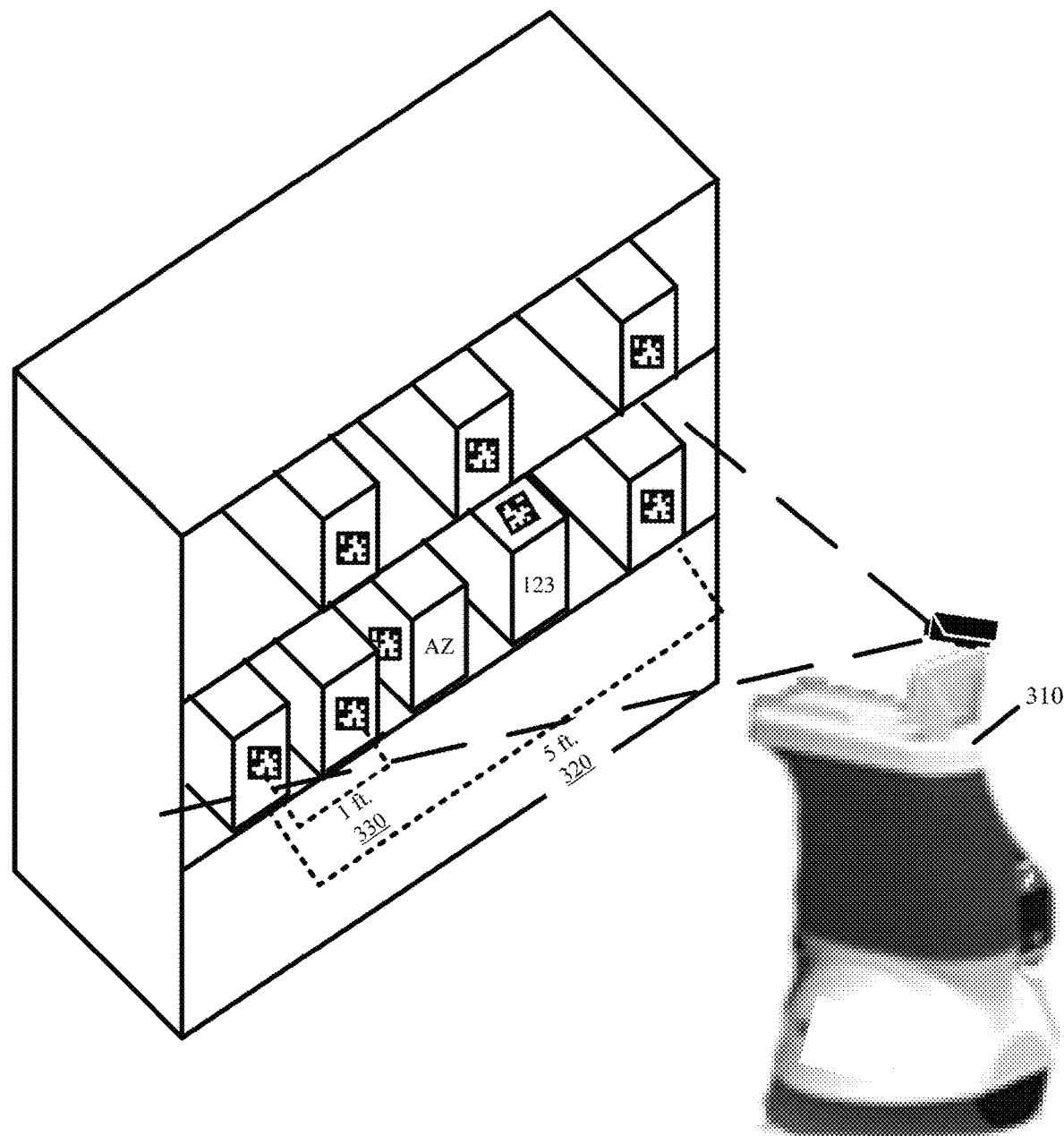
FIG. 3 illustrates dynamic and adaptive robot inventory management for horizontally arranged items based on a repeating feature.

It should be noted that the robots of some embodiments can apply the technique of FIG. 2 for managing inventory of horizontally arranged items and also front-to-back arranged items. FIG. 3 illustrates dynamic and adaptive robot inventory management for horizontally arranged items based on a repeating feature.

As before, the robot 310 positions itself so that an entire row of items appears within the robot 310 camera's field of view. The robot 310 takes an image or scan of the row using its sensory array. The robot 310 processes the image or scan to identify the total width of the row 320 and the minimum distance 330 between the repeating feature in the row. The robot divides the total width by the minimum distance to count the number of items in the row. The robot can then image or scan the next row to manage inventory of the next row.

In some embodiments, the robot 310 accounts for gaps between adjacent items in the row to more accurately compute the horizontally arranged item inventory. In some such embodiments, when the robot 310 processes the image to compute the total width and minimum distance between the repeating feature, the robot 310 also detects and measures any gaps between the items. The gaps are distinguishable because of a lack of any pattern appearing in those spaces. Therefore, the robot computes the total width between two items at either end of the row and subtracts any measured gaps from the total. The robot computes the minimum distance between the repeating feature and subtracts any gap between the two items. The robot then computes the number of items in the row using the gap modified total width and the gap modified minimum distance between the repeating feature.

Figure 4:
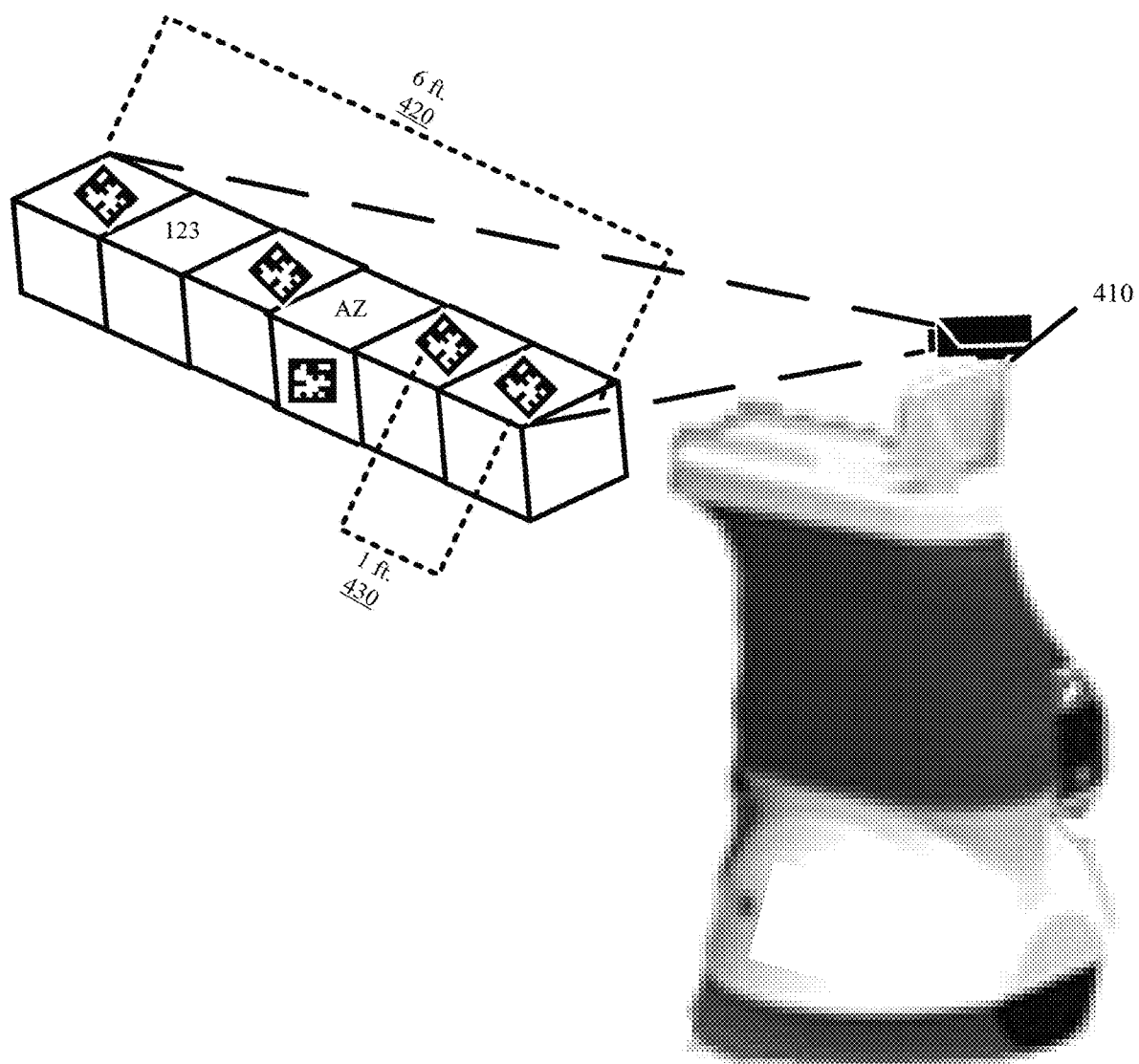
FIG. 4 illustrates dynamic and adaptive robot inventory management for front-to-back arranged items based on a repeating feature.

FIG. 4 illustrates dynamic and adaptive robot inventory management for front-to-back arranged items based on a repeating feature. The robot 410 images or scans the tops of the front-to-back arranged items provided that the item tops are not obscured. The robot 410 processes the image or scan to identify the total depth 420 of the arrangement and the minimum depth 430 between two items based on one or more repeating features on the item tops. From these measurements 420 and 430, the robot 410 dynamically determines the total number of items in the front-to-back arrangement.

In some embodiments, the robot 410 images or scans the sides of the front-to-back arranged items when the sides are exposed. The sides may be imaged in addition to the imaging of the item tops to provide a supplemental set of information from which the robot can compute the arrangement depth and minimum depth between two adjacent items. The item sides could also be imaged instead of the item tops when the tops are obscured.

The repeating feature inventory management may however be unreliable for certain items or certain stacks. This can occur when there is too much variance in the detection of a repeating feature. The variance can result because of too many different item orientations in the stack such that a single repeating feature does not consistently appear in the image or because the obtained image does not provide sufficient granularity from which the robot can accurately extract a repeating feature or identify gaps between items. Insufficient granularity in the image may be due to the robot camera having insufficient resolution, the robot being too far from the item stack when taking the image, the resulting image being blurry, or because the items in the stack are simply too small. For example, clothing may be packaged in plastic bags that fold or bend any feature on the bag and the height of each clothing item may be less than a few inches rendering any features on the bag indiscernible. In such cases, the robot can perform different dynamic and adaptive robot inventory management.

Figure 5A:
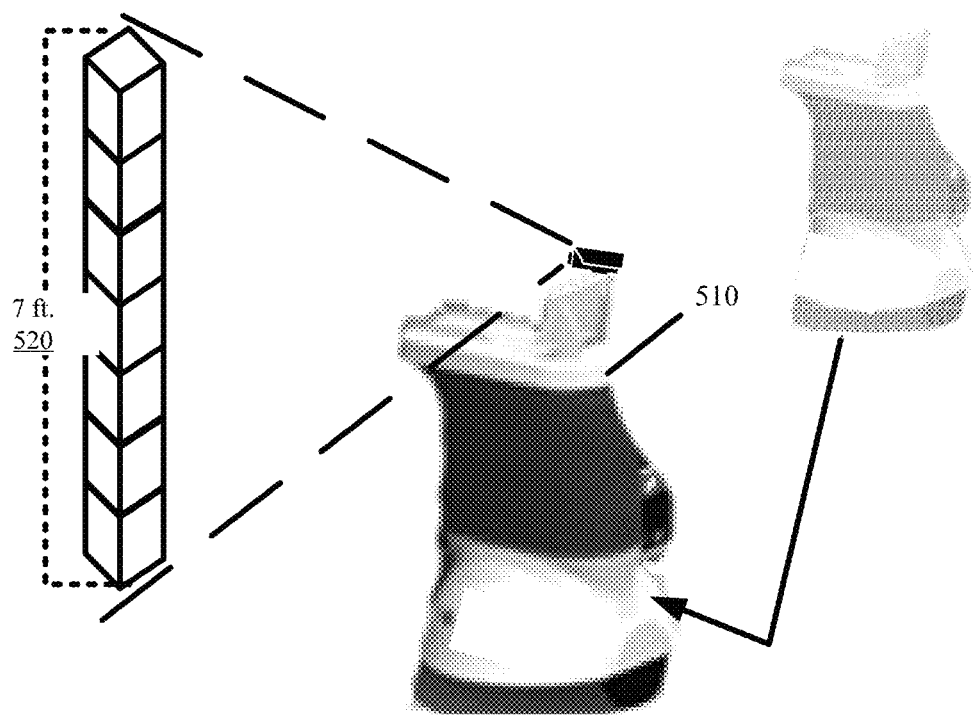
FIGS. 5A and 5B illustrate an alternative robot implemented methodology for dynamically and adaptively managing inventory for stacked items in accordance with some embodiments.
Figure 5B:
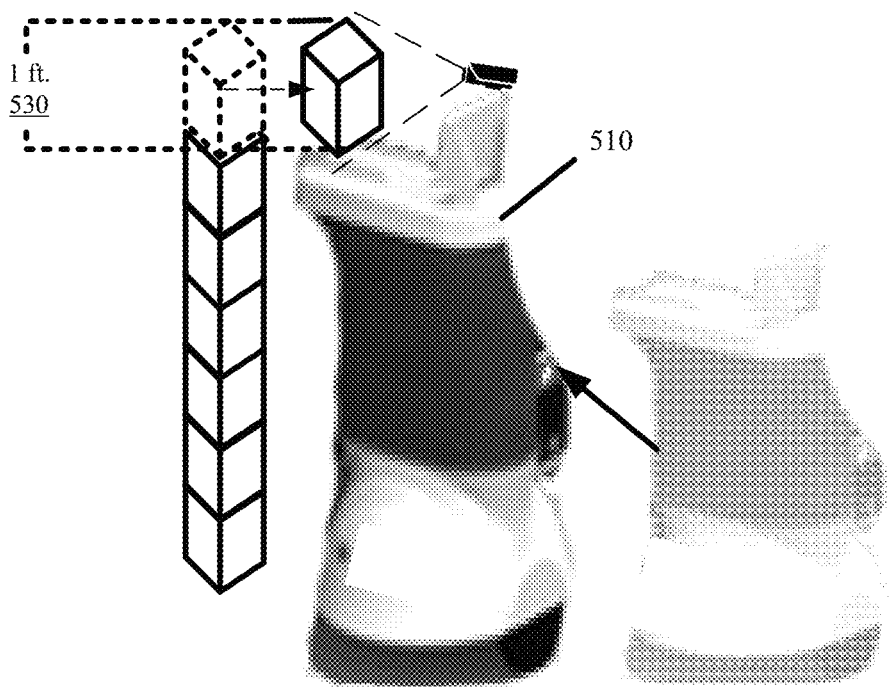

FIGS. 5A and 5B illustrate an alternative robot implemented methodology for dynamically and adaptively managing inventory for stacked items in accordance with some embodiments. In FIG. 5A, the robot 510 positions itself before the item stack. The robot 510 then uses its sensory array to determine the stack height 520. In particular, the robot 510 scans or images the entire stack. The robot 510 processes the stack image in order to obtain a height measurement 520 for the stack. It should be noted that unlike the image processing performed in FIG. 2, the height measurement 520 obtained for the stack is performed without reliance on a repeating feature in the image.

In FIG. 5B, the robot 510 lifts the topmost item off the stack and uses its sensory array to determine the single item height 530. In particular, the robot 510 images the single item. The robot 510 then processes the single item image to obtain the single item height measurement 530. The robot 510 may then return the item back to the stack.

The robot 510 manages the stack inventory using these the two measurements 520 and 530. In particular, the robot 510 dynamically determines the number of items in the stack by dividing the stack height 520 by the single item height 530.

Rather than directly compute the single item height, the robot can indirectly determine the inventory count by layering the single item image over the stack image until the stack height is reached. This approach assumes that the stack image and single item image are taken from the same distance so that their proportions are not distorted.

The above embodiments can be simplified when the robot is able to retrieve the single item dimensions from a database or the robot receives the dimensions from another machine that tasks the robot with determining the item inventory. In such cases, the robot directly determines the stack height. The robot can take an image of the stack and process the image with one or more mathematical transforms or other computations in order to obtain the stack height.

Figure 6A:
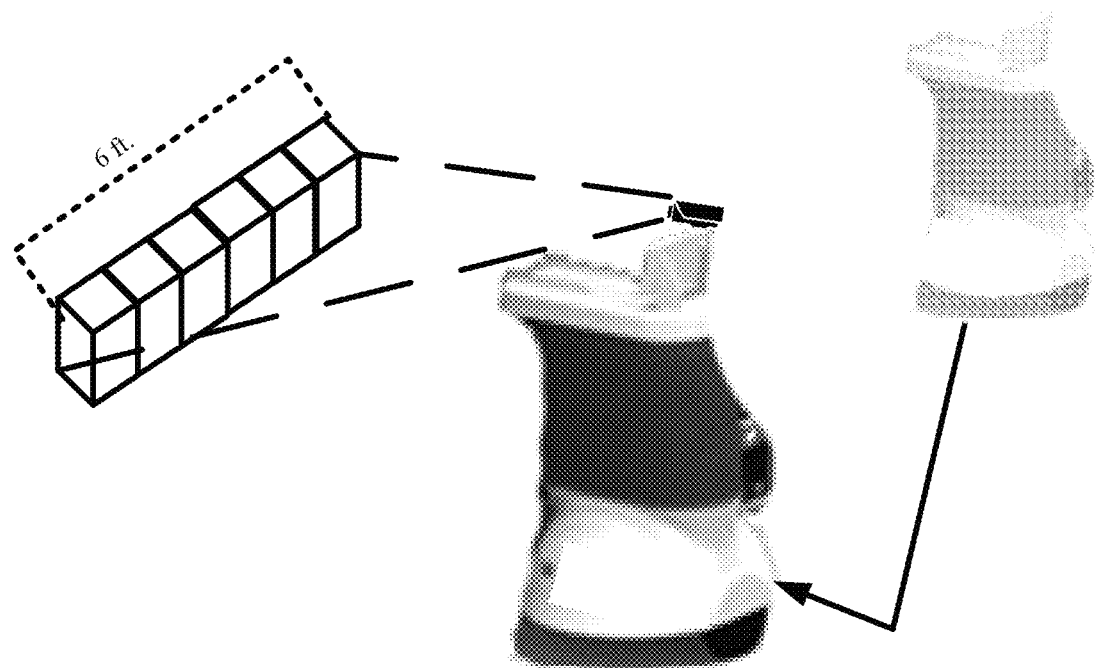
FIGS. 6A and 6B illustrate adapting the inventory management technique of FIGS. 5A and 5B for tracking inventory of horizontally arranged items in accordance with some embodiments.
Figure 6B:
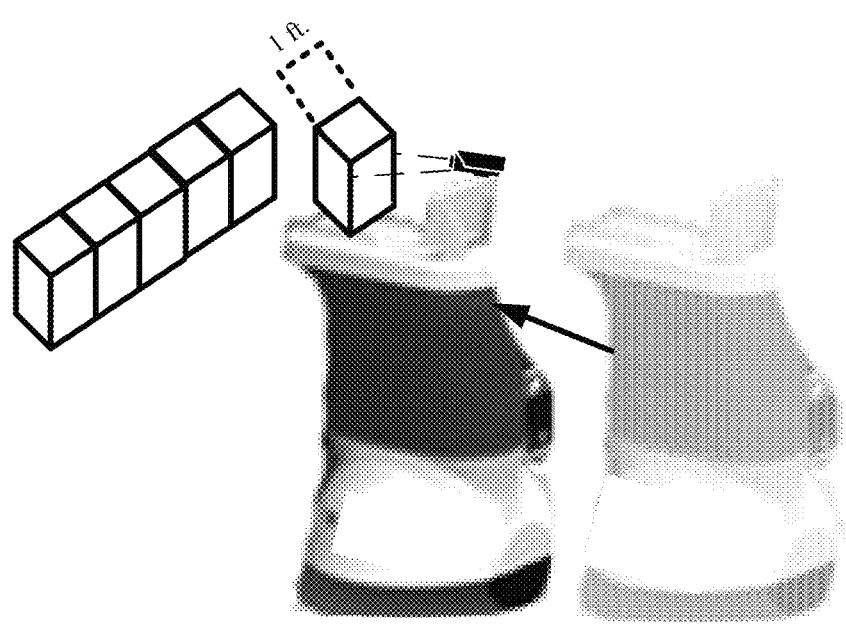

FIGS. 6A and 6B illustrate adapting the inventory management technique of FIGS. 5A and 5B for tracking inventory of horizontally arranged items in accordance with some embodiments. In FIG. 6A, the robot images or scans the horizontally arranged items to obtain the total width. In FIG. 6B, the robot extracts a single item to obtain the single item width or queries a database for the single item width. The robot divides the total width by the individual item width to track the inventory in the row. Once again in performing the total width determination in FIG. 6A, the robot can detect and account for any gaps between any two adjacent items as part of computing the total width.

The inventory management technique of FIGS. 5A, 5B, 6A and 6B can also be adapted for tracking inventory of front-to-back arranged items in accordance with some embodiments. The robot operation is similar with the robot imaging or scanning the front-to-back item arrangement to obtain the total depth and with the robot temporarily extracting a frontmost item from the arrangement to obtain the single item depth. The extraction can be avoided when the single item depth can be obtained from a database.

In some embodiments, the robots rely on sensors other than an imaging camera to determine the height of vertically stacked items, the width of horizontally arranged items, and the depth of front-to-back arranged items. In some such embodiments, the alternative sensors may obtain more accurate measurements or may obtain the measurement more efficiently (i.e., less computational effort or power consumption). Accordingly, some embodiments utilize range finding sensors including LiDAR, depth-of-field cameras, structured light (active stereo) sensors, passive stereo sensors, scanners, infrared sensors, acoustic sensors, or radio beacon receivers to obtain the measurements for an item arrangement.

Figure 7:
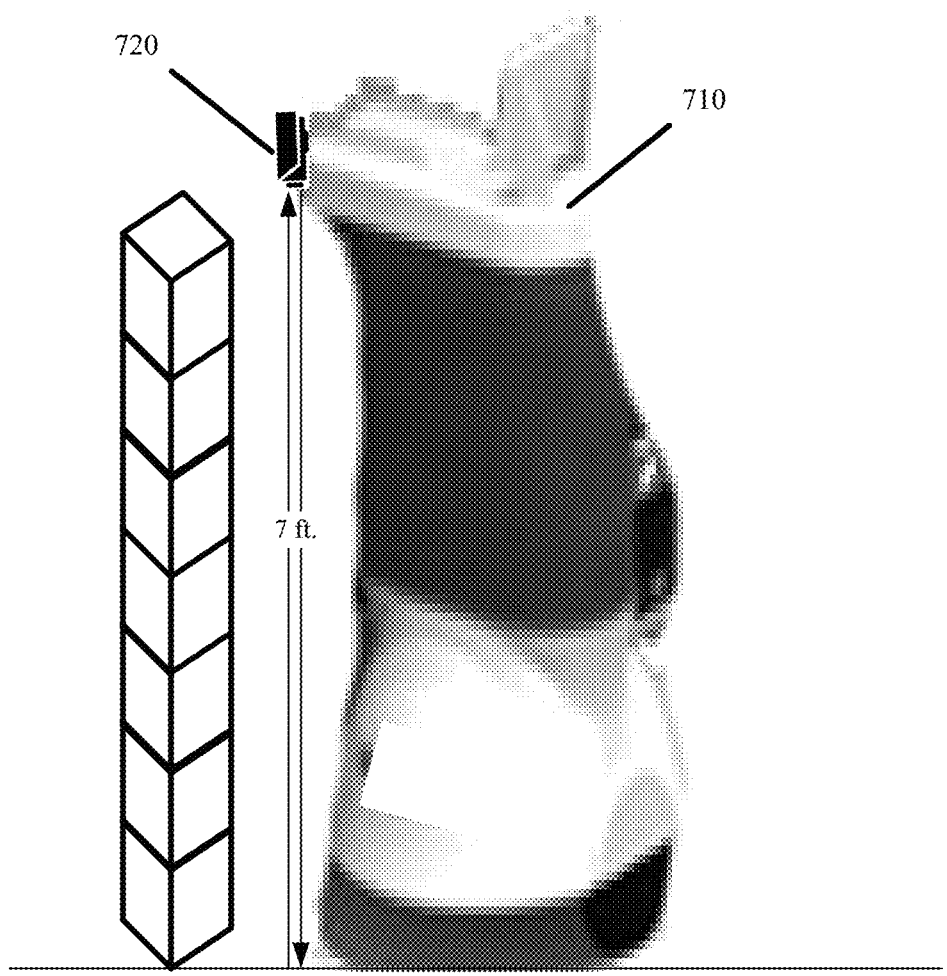
FIG. 7 illustrates robot usage of a range finding sensor for managing inventory of stacked items in accordance with some embodiments

FIG. 7 illustrates robot usage of a range finding sensor for managing inventory of stacked items in accordance with some embodiments. In this figure, a robot 710 navigates to a position that is adjacent to the item stack. The robot 710 lifts a range finding sensor 720 to the top of stack. The range finding sensor 720 fires downward from the stack top to the base on which the stack is placed. The sensor 720 measures the stack height. The sensor 720 can use imagery, lasers, light, sound, or other signals to determine or measure the distance between the stack top and bottom. For example, the distance can be measured based on laser time-of-flight, interferometry, or image processing. The robot also obtains the single item height from a database, using the lift and image methodology above, or by firing the range finding sensor 730 from just over the first item in the stack. The robot processor divides the determined stack height by the single item height in order to compute the number of items in the stack.

Figure 8:
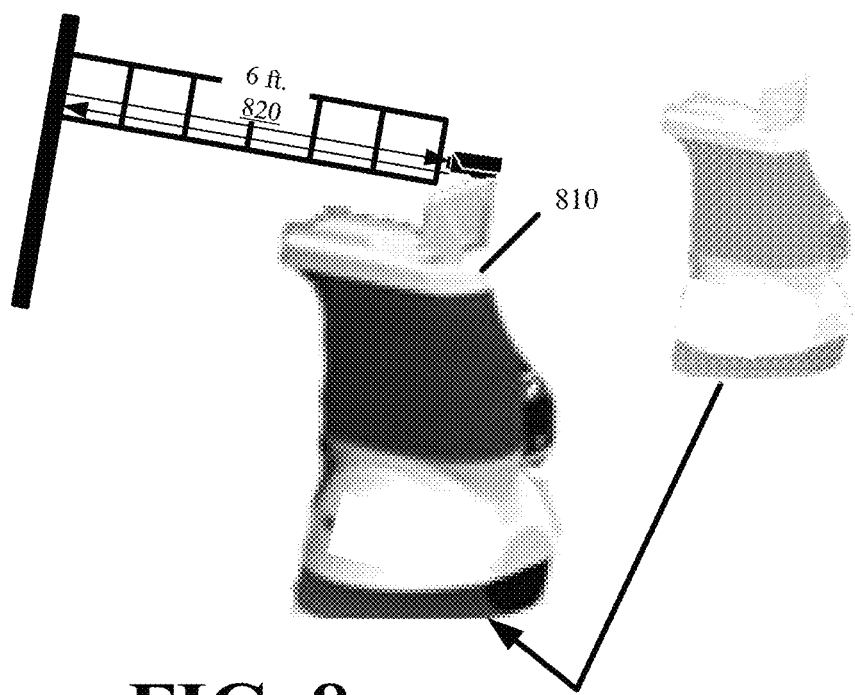
FIGS. 8-10 illustrate adapting the robot range finding sensor for dynamically managing inventory of items arranged horizontally or front-to-back in accordance with some embodiments.
Figure 9:
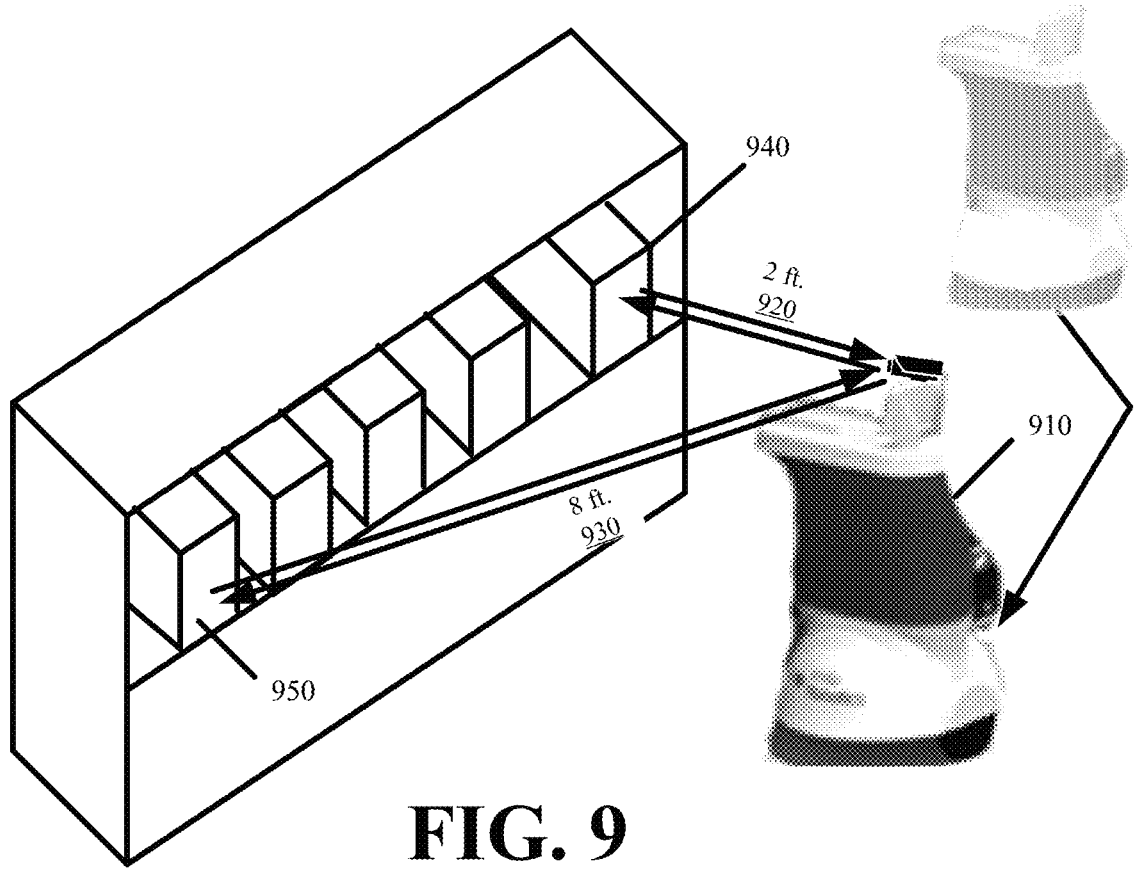
Figure 10:
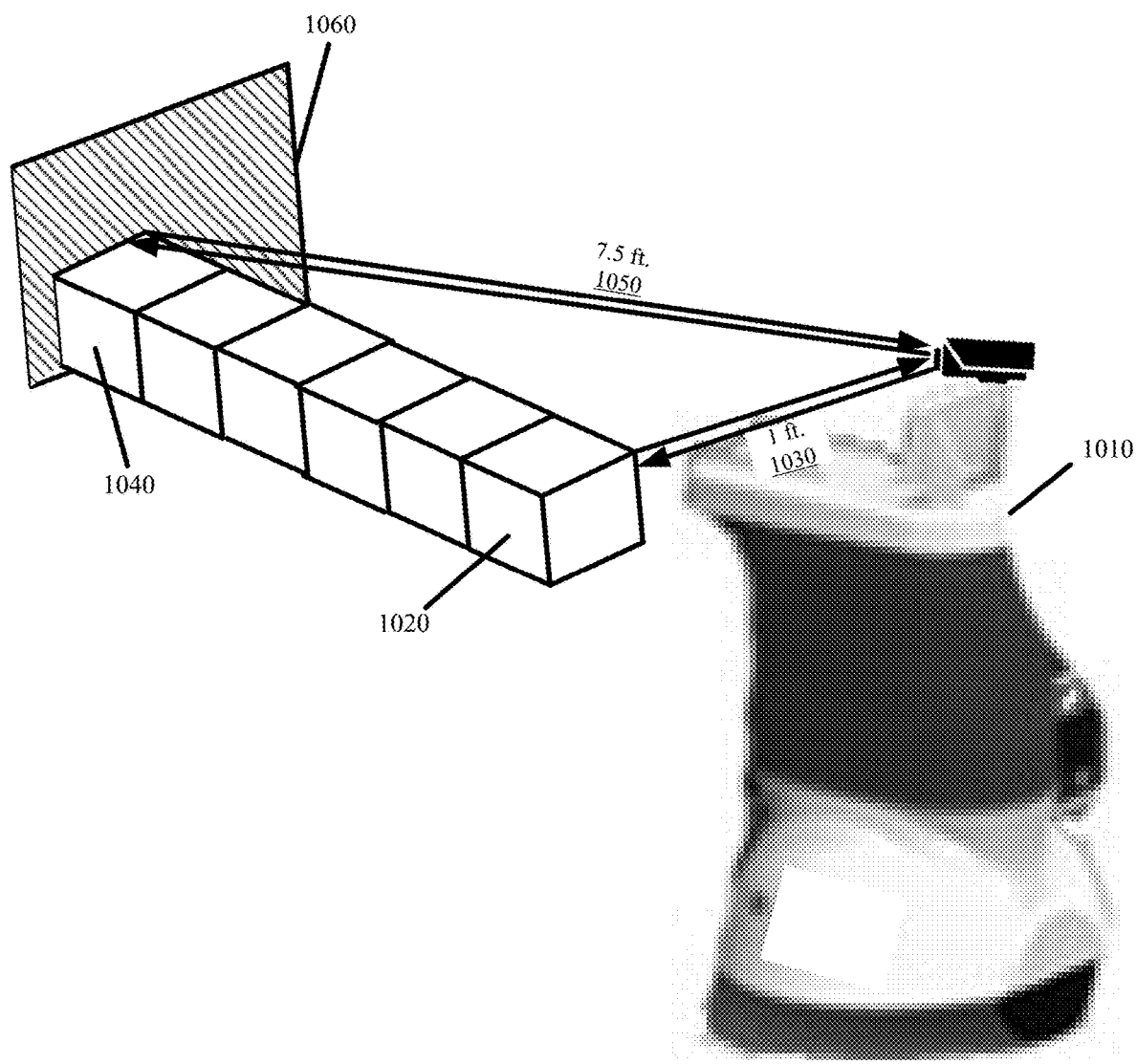

FIGS. 8-10 illustrate adapting the robot range finding sensor for dynamically managing inventory of items arranged horizontally or front-to-back in accordance with some embodiments. Specifically, FIG. 8 illustrates the robot 810 positioning itself at one end of a side-by-side or lateral arrangement of items. The robot 810 uses the range finding sensor from the robot sensory array to measure the width 820 spanned by the lateral arrangement. In this case, the lateral arrangement may position the last item against a far wall. The range finding sensor fires to the far wall in order to obtain the total width measurement 820. The robot obtains the individual item width from a database or by extracting and measuring a single item. The robot divides the total width by the individual item width to then dynamically compute the inventory for that particular arrangement.

FIG. 9 illustrates the robot 910 of some embodiments using the range finding sensor from an offset position for inventory management of a side-by-side item arrangement. In particular, the offset position places the robot 910 at one end of the arrangement such that the robot 910 is not directly parallel with the item arrangement. The robot 910 uses the range finding sensor to obtain a first measurement 920 of the robot's distance from one end of the arrangement and a second measurement 930 of the robot's distance from the opposite end of the arrangement. For the first measurement 920, the robot 910 aims the range finding sensor at the item 940 that is before the robot 910 at the proximal end of the arrangement. For the second measurement 930, the robot 910 aims the range finding sensor at the item 950 at the distal end of the arrangement. From these two measurements 920 and 930, the robot 910 accurately computes the total width of the arrangement. In particular, the two measurements 920 and 930 allow the robot to determine the total width while accounting for its positional offset.

FIG. 10 illustrates adapting the same offset technique and the range finding sensor for inventory management of a front-to-back item arrangement. Similar to FIG. 9, the robot 1010 first aims the range finding sensor to the frontmost item 1020 in the front-to-back item arrangement to obtain a first measurement 1030. The robot 1010 then aims the range finding sensor to the backmost item 1040 to obtain a second measurement 1050. In some embodiments, the robot 1010 can aim the range finding sensor to a back wall 1060 of shelving or a dispenser on which the items are placed to obtain the second measurement 1050 when the backmost item abuts the back wall 1060 and the items are removed from front-to-back.

From the two measurements 1030 and 1050, the robot 1010 computes the total depth of the front-to-back arrangement. The robot 1010 next obtains the depth of a single item in the arrangement. The robot 1010 can use the range finding sensor to obtain measurements to the front and back of a single item in order to determine the item's depth. The robot 1010 can also extract and measure the item or query a database to obtain its depth. The robot 1010 then divides the total depth by the single item depth in order to dynamically determine the number of items in the arrangement.

Figure 11:
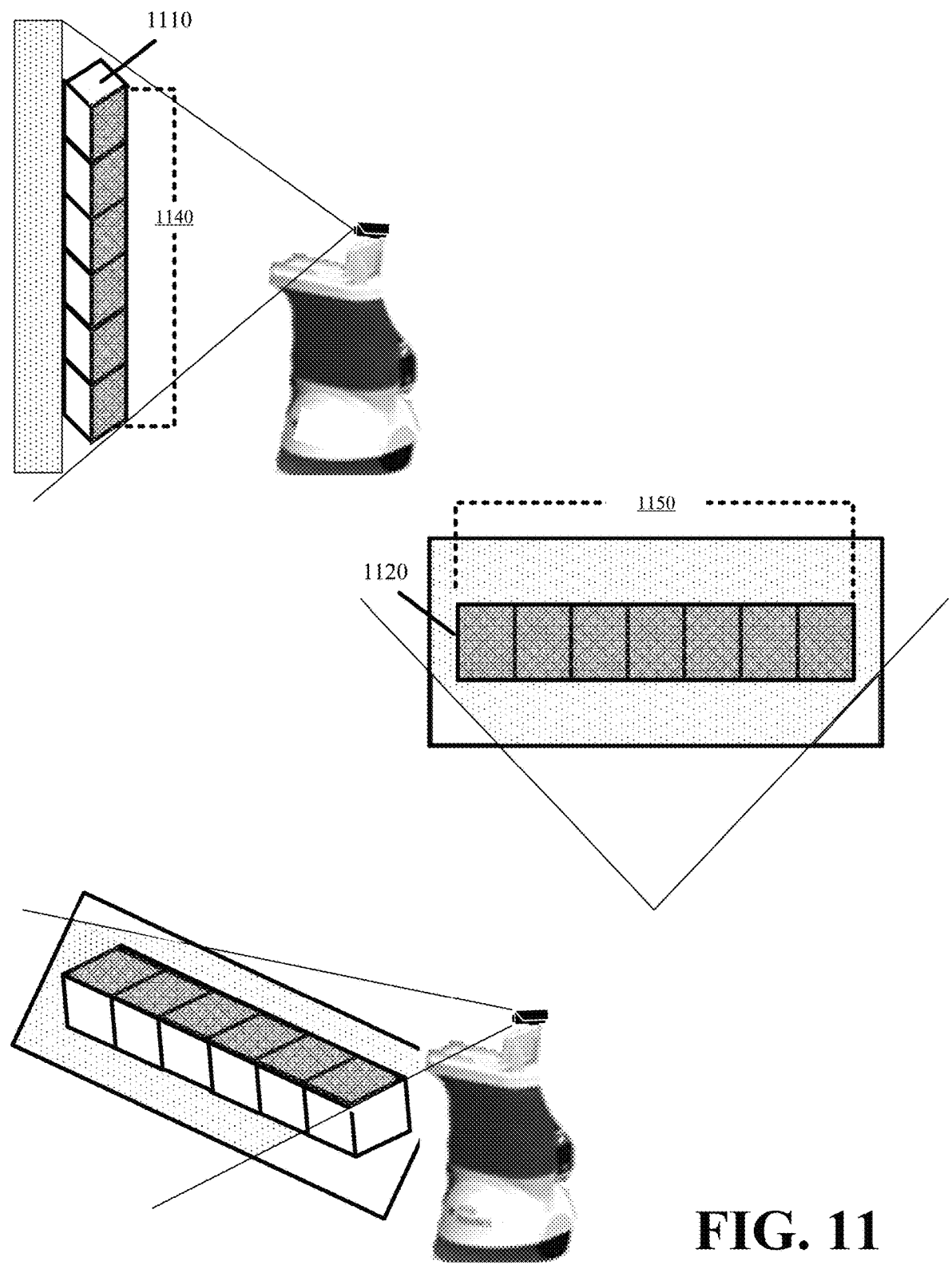
FIG. 11 illustrates active stereo based inventory management in accordance with some embodiments.

As noted above, the robots can engage a plurality of different sensors for dynamic and adaptive inventory management. In some embodiments, the robots engage sensors for active stereo based measuring of item arrangement height, width, or depth. FIG. 11 illustrates active stereo based inventory management in accordance with some embodiments. The robot positions itself before a particular arrangement of items. This figure illustrates a vertically stacked item arrangement 1110, a horizontal item arrangement 1120, and a front-to-back arrangement 1130. The robot projects structured light onto the arrangement using a projector within the robot sensory array. As shown, the structured light projected onto the different arrangements 1110, 1120, and 1130 is a condensed pattern of dots with the structured light also projecting onto shelving, walls, or anything else around the item arrangement. Other patterns, shapes, or structured light variations can be used. A sensor from the robot sensory array then decodes measurements based on the size, concentration, number of dots, and other features of the structured light pattern. For instance, the number of dots read from a common plane of dots measures the length, width, or depth of that plane. The density or concentration of dots identifies the robot's distance from the plane. Thus, for arrangement 1110, the sensor can differentiate the pattern between 1140 from the pattern on the back wall and can quickly determine the height of the arrangement 1110 based on the pattern between 1140. Similarly, for arrangement 1120, the sensor can differentiate the pattern between 1150 from the pattern on the back wall and can quickly determine the width of the arrangement 1120 based on the pattern between 1150. These measurements are then used with the height, width, or depth for an individual item in the arrangement 1110, 1120, or 1130, whether obtained from a database or elsewhere, in order to dynamically determine the number of items in the arrangement 1110, 1120, or 1130. As FIG. 11 illustrates how one form of adaptive stereo can be used by the robots for dynamic inventory management, other forms of adaptive stereo can be similarly used by the robots for inventory management.

The same inventory management robots can also adapt their movements and sensory array for managing inventory of items that are contained and dispensed from different dispensers. Dispensers often have an outer frame in which several items are contained. The frame shields the robot's sensory array from scanning the dimensions of all items in the dispenser. In other words, even if the robot knows a single item's dimensions, the robot is unable to determine the item inventory because it cannot perform the relative comparison between the single item's dimensions to the combined dimensions of all items in the dispenser.

One kind of dispenser is a gravity flow dispenser. A gravity flow dispenser contains a set of items with some vertical offset between each item. There is an opening where the bottommost item is located with a lever, tab, or other stopper holding the bottommost item in place until the lever, tab, or stopper is jostled or the item is retrieved from the dispenser. The vertical offset imposes a gravitational force such that when the bottommost item is dispensed, the next bottommost item is pushed into position for dispensing.

Figure 12A:
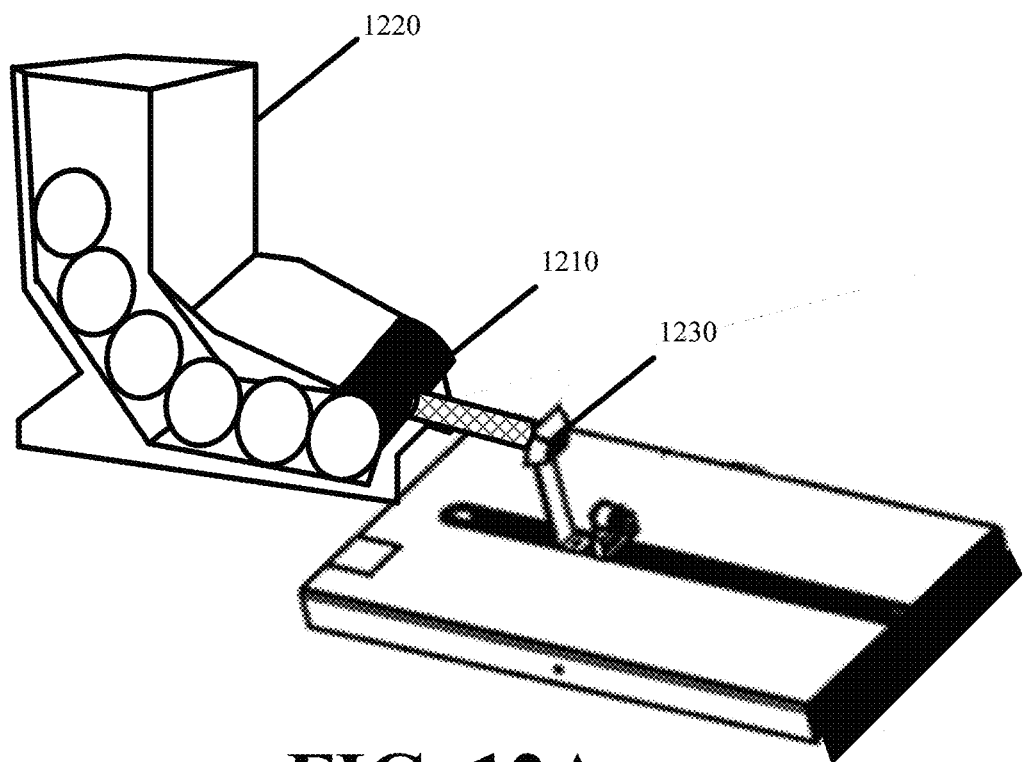
FIGS. 12A and 12B illustrate dynamic and adaptive robot inventory management for items contained within a gravity flow dispenser.
Figure 12B:
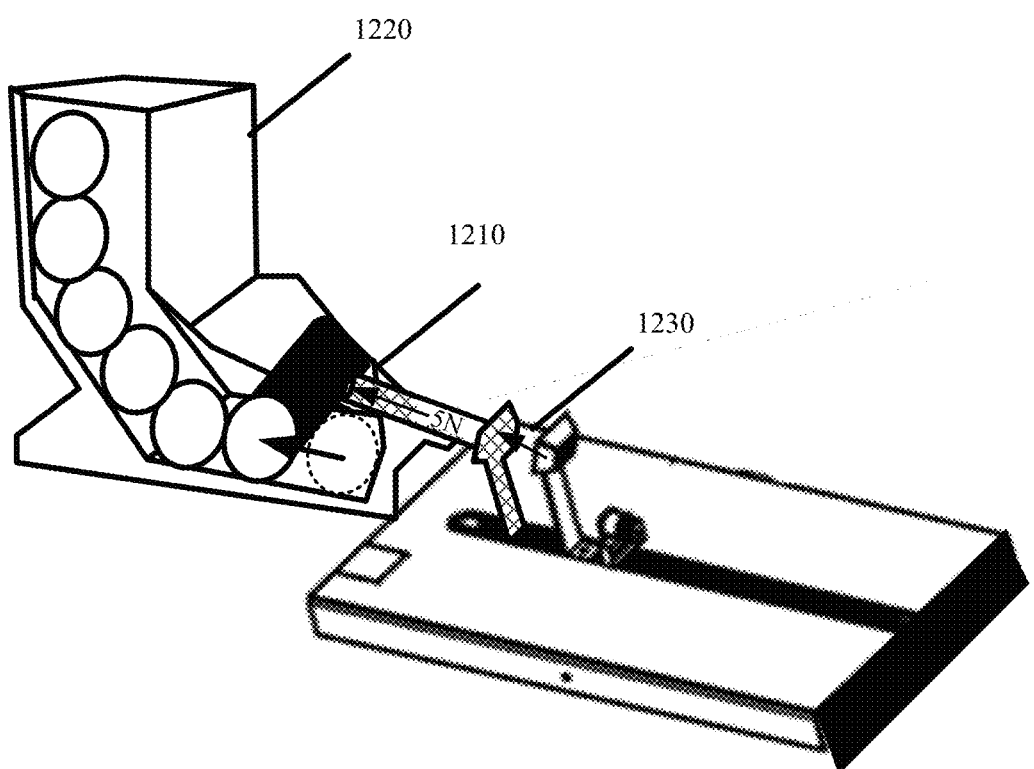

In accordance with some embodiments, FIGS. 12A and 12B illustrate dynamic and adaptive robot inventory management for items contained within a gravity flow dispenser. In these figures, the robot uses the sensory array to measure the gravitational force on the bottommost item 1210 in the dispenser 1220.

In FIG. 12A, the robot places an extendible arm or pusher 1230 against the bottommost item 1210. In FIG. 12B, the robot gradually increases the force for extending the arm 1230 until the robot detects movement of the arm which, in turn, causes the item 1210 to move back into the dispenser 1220. The robot measures the amount of force taken to move the item 1210 and correlates this measurement to the gravitational force on the bottommost item 1210. In some embodiments, the arm or pusher 1230 is pressure sensing. In some such embodiments, the robot extends the arm 1230 until the bottommost item 1210 moves some distance back into the dispenser 1220. The robot temporarily holds the arm 1230 at that position until the pressure on the arm 1230 is measured. In this case, the pressure measurement is correlated to the gravitational force on the bottommost item 1210.

The robot retracts the arm 1230 once a correlative measure for the gravitational force is taken. The weight or mass of a single item in the dispenser 1220 is then obtained. The robot can obtain the weight or mass by looking up the measure in a database or by receiving the measure from another machine directing the robot to manage the inventory of the items in the dispenser 1220. If the single item weight cannot be obtained from these sources, the robot retrieves the bottommost item 1210 from the gravity flow dispenser 1220, measures the single item 1210 weight using a scale or other load sensor in its sensory array, and then returns the item 1210 back into the dispenser 1220. The robot may have to deposit the item 1210 from the top or back of the dispenser 1220.

From the gravitational force, the robot computes the total weight or mass of the items in the dispenser. The equation is mass=F/g, wherein F is the gravitational force and g is the acceleration due to gravity or 9.8 meters per seconds squared. The robot divides the total weight by the single item weight to dynamically and adaptively determine the number of items in the dispenser. If the gravity flow dispenser 1220 top or side is open, the robot could alternatively use any of the above described front-to-back inventory management techniques to track the number of items in the dispenser 1220.

Another common type of dispenser is a back-to-front push dispenser. This dispenser uses a spring and backstop to push items from the back to the front of the dispenser. The dispenser provides an opening with a lever, tab, or other stopper holding the frontmost item in place until it is dispensed by jostling the lever, tab, or other stopper or by retrieving the item from the dispenser. Here again, the items stored in the dispenser are hidden from the robot's sensory array.

Figure 13:
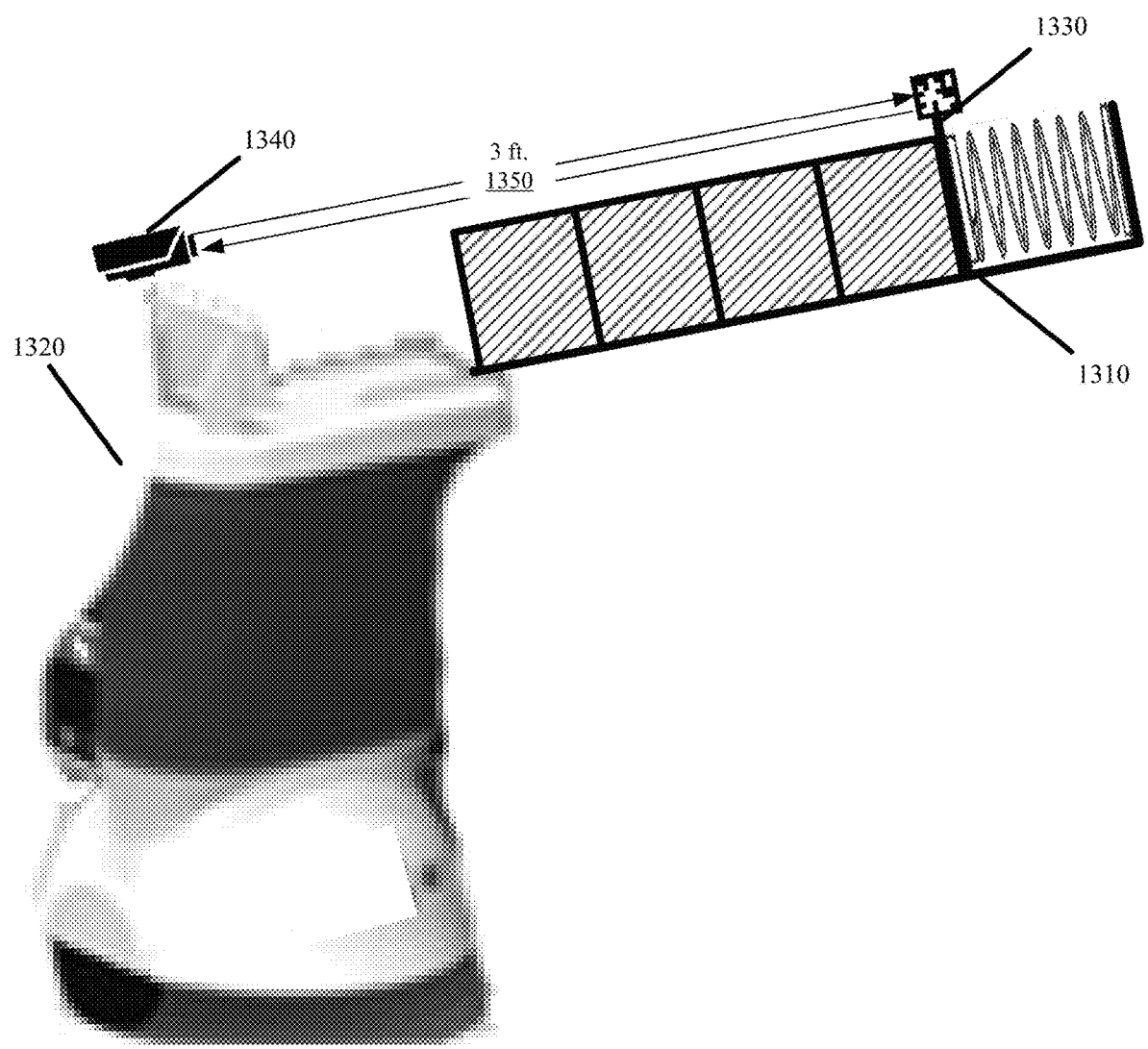
FIG. 13 illustrates dynamic and adaptive robot inventory management for items contained within a back-to-front push dispenser.

In accordance with some embodiments, FIG. 13 illustrates dynamic and adaptive robot inventory management for items contained within a back-to-front push dispenser 1310. The robot 1320 moves to a position in front of the dispenser 1310. Using the sensory array, the robot measures the distance to the dispenser backstop 1330, wherein the backstop 1330 pushes against the last item in the dispenser 1310. The robot 1320 uses a range finding sensor 1340 from the sensory array to measure the distance 1350 from the dispenser 1310 front to the backstop 1330. Alternatively, the robot 1320 can use a camera from the sensory array to image the backstop 1330. The image is processed using transforms or mathematical equations to determine the distance 1350 to the backstop.

As shown in FIG. 13, the backstop 1330 may be enhanced with some visual identifier to assist the robot 1320 in the distance 1350 measurement. In some embodiments, the backstop 1330 includes a flag or tab that rises above, below, or to the side of the items in the dispenser 1310. In some embodiments, the backstop 1330 contains a light, unique coloring, a Quick Response (QR) code, or other such identification.

The robot 1320 computes the number of items in the dispenser 1310 based on the distance 1350 measurement. In some embodiments, the robot 1320 divides the distance 1350 measurement to the backstop 1330 by the length of a single item in the dispenser 1310. As before, the robot 1320 may retrieve the single item length from a database or may receive the single item length from another machine that is in communication with the robot 1320. If the robot 1320 cannot obtain the single item length from the database or another machine, the robot 1320 retrieves the frontmost item from the dispenser 1310. The robot 1320 then measures the single length using the sensory array before depositing the item back in the dispenser 1310.

In some embodiments, the push dispenser backstop may not be visible and the robot may therefore be unable to measure the distance to the last item. In some such embodiments, the robot adapts the FIGS. 12A and 12B methodologies to determine the distance measure. In particular, the robot uses the extendible arm or pusher to exert force on the frontmost dispenser item. The robot increases the force until the item is pushed some distance back into the dispenser. The robot measures the amount of force needed to impart movement. Knowing the dispenser spring constant, the robot then determines the total mass in between the robot arm and the dispenser spring. The robot divides the total mass by the mass of each individual item in order to track the number of items in the dispenser.

Figure 14A:
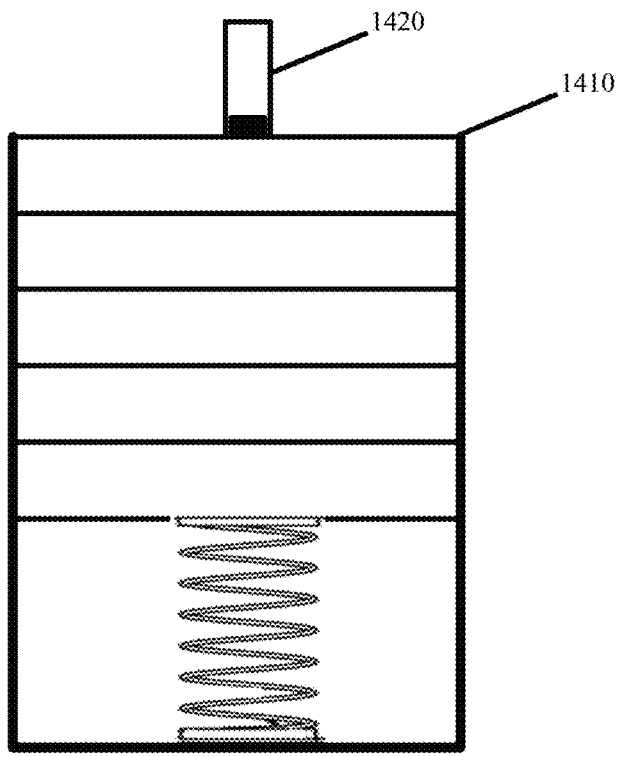
FIGS. 14A and 14B illustrate a robot performing dynamic inventory management for items placed in a bottom-to-top dispenser in accordance with some embodiments.
Figure 14B:
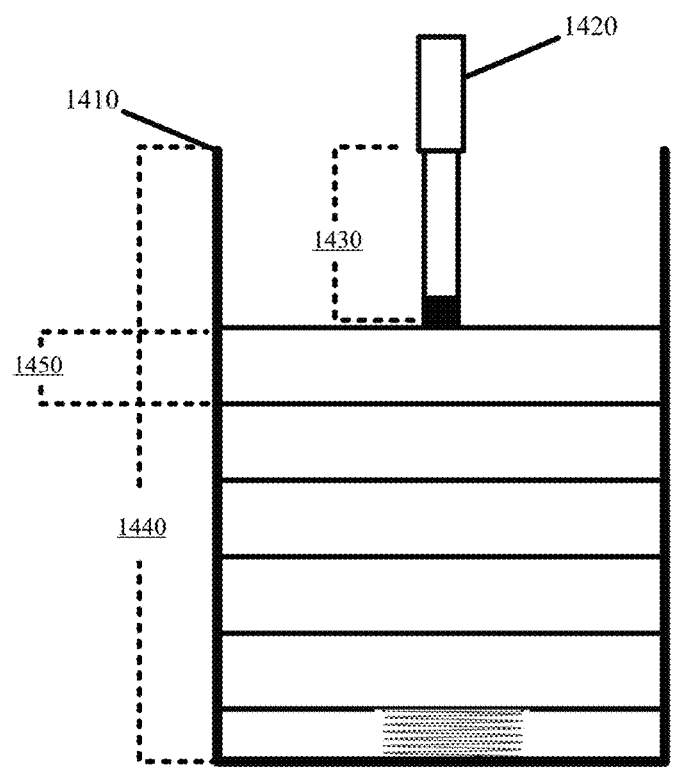

The robot can adaptively manage inventory in any other dispenser dispensing items with assistance from a spring or other force. FIGS. 14A and 14B illustrate a robot performing dynamic inventory management for items placed in a bottom-to-top dispenser 1410 in accordance with some embodiments. This dispenser 1410 has a spring or other push force at the bottom that pushes items upwards towards the top of the dispenser 1410. As one item is removed from the dispenser 1410, the spring pushes the remaining items up towards the dispenser top.

In FIG. 14A, the robot places an extendable arm 1420 over the topmost item of the dispenser 1410. The robot extends the extendable arm 1420 and begins to push down. The robot measures how far down it can push the stack.

FIG. 14B illustrates the furthest the robot extendable arm 1420 can push the stack into the dispenser 1410. The robot obtains a first measurement 1430 measuring the extendable arm 1420 extension. The robot obtains a second measurement 1440 for the dispenser height using any of the above described techniques or from a database. The robot obtains a third measurement 1450 for the height of an individual item using a database or by dispensing an item and measuring its height. The robot can then compute the number of remaining items in the dispenser 1410 from these three measurements 1430, 1440, and 1450. Thus, if the dispenser 1410 is thirty inches in height, the robot can push ten inches into the dispenser 1410, and the height of each item in the dispenser 1410 is four inches, then the robot can compute there are five total items in the dispenser 1410 (i.e., (30−10)/4=5). The same technique can be adapted for a top-to-bottom dispenser or a horizontal dispenser in which gravity, a spring, or other force pushes items out a dispenser opening.

FIGS. 14A and 14B can be adapted to perform inventory management based on the amount of force the robot extendible arm exerts onto the stack, rather than the distance extended. This method would therefore be similar to the method described with respect to FIGS. 12A and 12B above.

Figure 15:
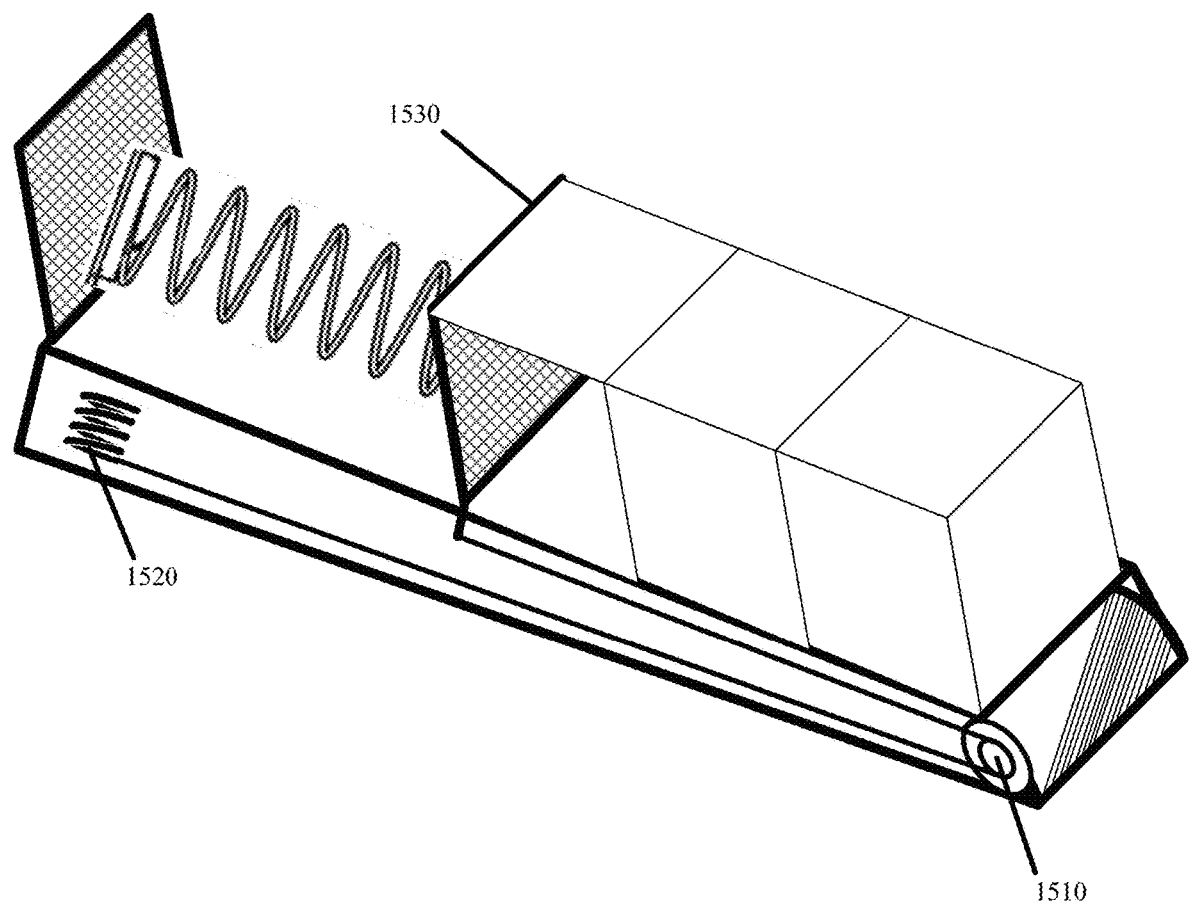
FIG. 15 illustrates a back-to-front push dispenser that includes a front indicator in accordance with some embodiments.

In some embodiments, the robot relies on other indicators to measure the distance to the last item in the dispenser. FIG. 15 illustrates a back-to-front push dispenser that includes a front indicator 1510 conveying the distance to the last item in the dispenser in accordance with some embodiments. The dispenser includes the front indicator 1510, a coil 1520, and a backstop 1530.

The indicator 1510 is illustrated as a cylinder. The cylinder rotates to display different markings. The cylinder rotation is proportional to the backstop 1530 movement. Accordingly, the changing indicator 1510 markings represent different backstop 1530 positions within the dispenser.

A wire or string is connected at one end to the coil 1520. The wire or string wraps around the indicator 1510 cylinder and connects to the backstop 1530 at the other end. As the backstop 1530 moves to the dispenser front with the removal of each item from the dispenser, the coil 1520 spools the wire or string. The coil 1520 spooling causes the indicator 1510 to rotate in a first direction, thereby changing the indicator 1510 markings displaying from the dispenser front. As the backstop 1530 moves to the dispenser back with the addition of items into the dispenser, the coil 1520 unspools the wire or string. The coil 1520 unspooling causes the indicator 1510 to rotate in a second direction that is opposite to the first direction, thereby reversing the indicator 1510 marking changes. In some embodiments, the indicator 1510 markings are sparse when the backstop 1530 moves to the back of the dispenser and are dense when the backstop 1530 moves to the front of the dispenser.

In some embodiments, the robots use their sensory array in combination with the markings displayed by the dispenser of FIG. 15 for dynamic and adaptive management of inventory. In particular, a robot approaches the dispenser so that the front indicator is within the robot sensory array field-of-view. The robot scans the cylinder markings using a camera, scanner, or other sensor from the sensory array. The robot decodes the distance to the backstop from the cylinder markings. The robot then obtains the dimensions for a single item contained within the dispenser and divides the distance to the backstop by the single item dimensions to determine the number of items in the dispenser.

The robots can also adapt to manage inventory for items that are loosely arranged to a bin. In some such embodiments, an inventory management robot retrieves the entire bin containing the loosely arranged items. The robot obtains the total bin weight using a scale or load sensors from the robot's sensory array. The load sensors may be integrated in a platform onto which the bin is retrieved.

The robot also obtains a single item weight. The robot may obtain the single item weight from a database or other machine. Alternatively, the robot may retrieve a single item from the bin, weigh the item, and return the item to the bin. The robot then dynamically computes the total number of items in the bin by dividing the bin weight by the individual item weight. In performing the computation, the robot can account for the weight of the empty bin. In some embodiments, the empty bin weight is preconfigured as a robot parameter.

It should be noted that robotic inventory management can be performed with any of the above techniques individually or through a combination of any two or more of the above techniques. For example, a robot may perform inventory management of items that are stacked atop one another with multiple stacks arranged front-to-back. Rather than track the number of items for each stack, the robot may determine the number of items in the frontmost stack using the process or a similar process as described above with respect to either FIG. 2 or FIGS. 5A and 5B above. The robot can then perform a different process to determine the number of stacks arranged front-to-back before multiplying the number of items per stack to the number of identified stacks provided that the stacks are of similar heights.

The inventory management described thus far has involved dynamically and adaptively determining stock of different items irrespective of the item dimensions or different item arrangements. In some embodiments, inventory management further involves the robots updating an inventory database with the tracked counts, wherein the updating occurs wirelessly and in real-time as the robots dynamically and adaptively obtain the counts for different items. The inventory database can then be used to keep track of the entire inventory on hand and generate orders in order to replenish low stock.

In some embodiments, inventory management further involves the robots automatically and intelligently replenishing item inventory based on the tracked counts. In some such embodiments, a robot dynamically and adaptively determines the number of a particular item that is in stock using any one or more of the above techniques. If the particular item inventory is less than a specified threshold, the robot automatically generates an order for additional units of the particular item from the manufacturer or distributor. Orders placed by the inventory management robots can be routed to a central server where they are aggregated and issued collectively. For example, the central server can receive orders from three different inventory management robots throughout the day as the robots go about tracking inventory for different items. The central server then places the order at the end of the day with the manufacturer or distributor.

Figure 16:
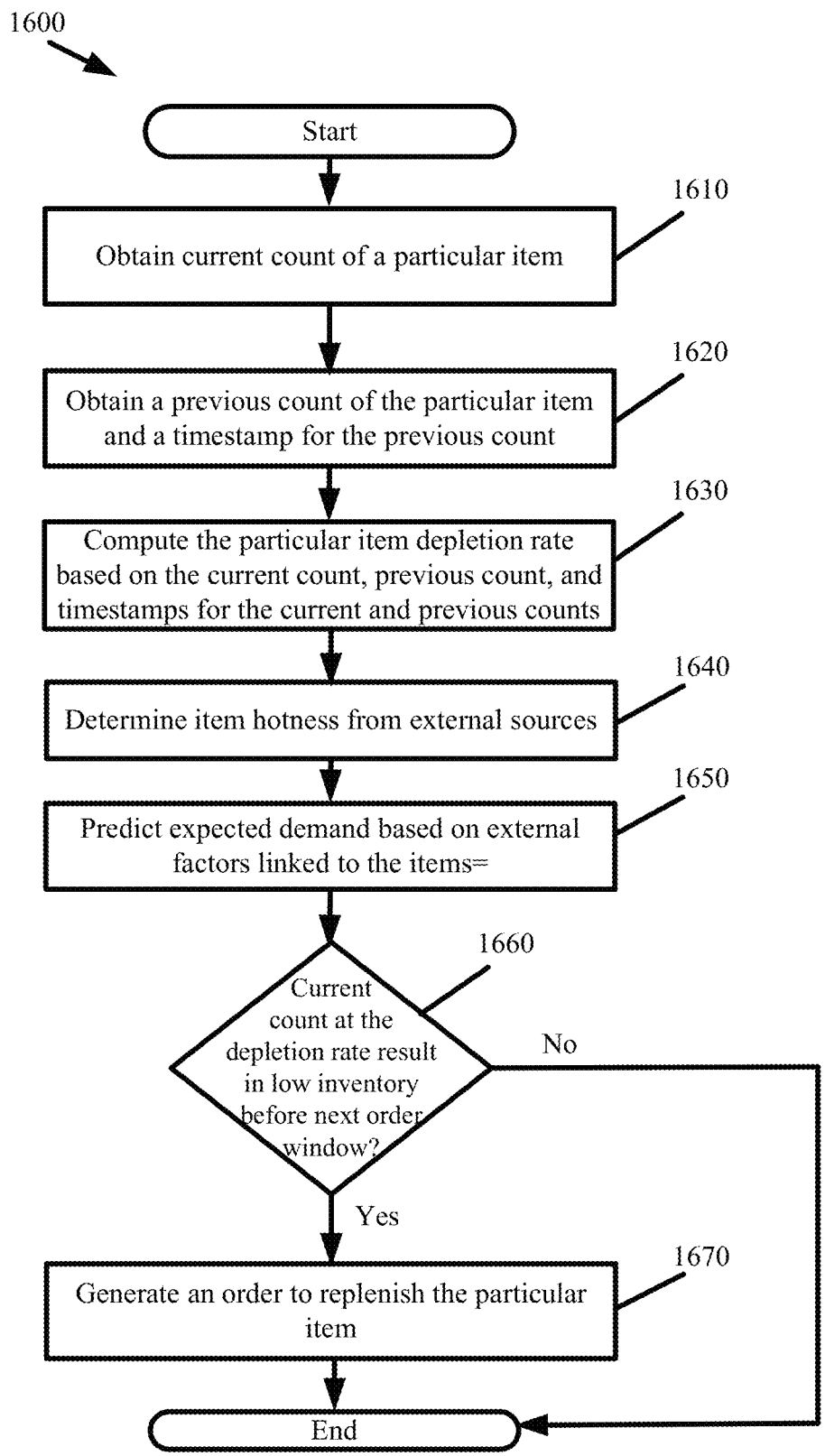
FIG. 16 presents a process performed by an inventory management robot or system in which the robot operates for replenishing a particular item in inventory based on a dynamic threshold.

The robots can be configured with different order replenishment thresholds for different items. These thresholds can also be dynamic and based on a rate or demand for items. FIG. 16 presents a process 1600 performed by an inventory management robot or system in which the robot operates for replenishing a particular item in inventory based on a dynamic threshold.

The process obtains (at 1610) the current count of the particular item using the robot and any one or more of the dynamic and adaptive techniques described above. The process also obtains (at 1620) a previous count of the particular item and a timestamp for the previous count. The particular previous count can be obtained from a database, another robot, or stored to the robot memory as a result of the robot having tracked the particular item inventory count at some prior point in time.

Next, the process computes (at 1630) the particular item depletion rate based on the current count, previous count, and timestamps for the current and previous counts. The process further determines (at 1640) the hotness of the item from external sources and predicts (at 1650) expected demand based on external factors that are linked to the item. With respect to hotness, the process performs queries to determine if the item is trending on social media or retrieves search queries to determine what percentage of search queries are directed to the item relative to other items in inventory or if the number of search queries for the item has increased in some time window. With respect to predicting demand, one or more external factors can be linked to an item. The external factors can specify whether an item is seasonal. Thus, if the item mostly sells during a holiday and the holiday is nearing an end, the process can reduce the amount of inventory that should be on hand for that item. Similarly, if the item is a winter item and winter is approaching, the process can increase the amount of inventory that should be on hand for that item. Accordingly, the process determines (at 1660) if the current count in view of the identified item depletion rate, item hotness, and predictive factors will result in low or depleted inventory before the next replenishment window.

If so, the process automatically generates (at 1670) an order to replenish the particular item. In some embodiments, the order quantity is determined from the current count, depletion rate, hotness, and predictive factors. Otherwise, no action is taken.

As an example of process 1600, the robot may determine that there are ten units of a first item in stock and fifty units of a second item in stock with the first item depleting at a rate of one unit per day and the second item depleting at a rate of ten units per day. Based on the depletion rates, the robot determines that there are ten days worth of the first item in stock but only five days worth of the second item in stock. Accordingly, the robot may replenish only the second item by submitting an order for additional units of the second item from the manufacturer or distributor, even though there is less units of the first item in inventory.

Inventory management can further leverage the depletion rates for optimizing the positioning of items within a distribution site or warehouse. In some such embodiments, the robots determine different item depletion rates as part of managing item inventory. The depletion rates for different items are compared against one another in order to identify high demand items from low demand items. Inventory management then involves the robots moving the high demand items together for efficient order fulfillment and moving the low demand items to more distance locations. As one example, the robots may move the high demand items closer to packaging or shipping stations while moving the low demand items away from the packaging or shipping stations. As another example, the robots may place the high demand items at ground level or a level at which the robots can retrieve the high demand items with minimal positional adjustments, while low demand items may be placed on shelves or platforms that require the robots to elevate, rotate, or make additional such positional adjustments in order to retrieve the low demand items.

In some embodiments, inventory management further involves tracking item distribution. In certain cases, it is important to track not only the item that is sent to a recipient, but also origin information related to the item. This is particularly important for items that may be recalled. As noted above, lot numbers are placed on item labels or packaging for this purpose.

The lot number can identify one of several manufacturing facilities that produce an item. The lot number can identify a particular manufacturing run representing a date and time when a set of items were produced. The lot number can also identify different components that were used in the manufacturing of an item.

To track item distribution, the robot scans the lot number or other similar identifier from an item during item retrieval. In some embodiments, the robot rotates the item before a camera in the robot sensory array during retrieval. The camera continually images the item until the lot number is identified. The robot then associates the lot number to the retrieved item and the particular customer order received the retrieved item.

In some embodiments, the robot scans the item lot number prior to retrieving the item from a dispenser. As was illustrated in FIGS. 12A and 12B, the robot uses its retrieval arm to push against the frontmost item in the dispenser. The push force exerted by the robot causes the item to roll or rotate some amount back into the dispenser. The robot camera scans the first item during this rotation until the lot number is scanned. Thereafter, the robot can retrieve the item and associate the scanned lot number to the order.

We claim:

1. A method for managing inventory with a robot, the robot comprising a sensory array and a processor, the method comprising:
   aiming a sensor of the sensory array at first and last items of a plurality of items in a particular arrangement, wherein the first and last items are separated by at least one other item of the plurality of items;
   detecting, by operation of the robot, a first unique feature on a side of the first item that is within a field-of-view of the sensor, and a second unique feature on a side of the last item that is within the field-of-view based on first output from the sensor;
   measuring, by operation of the robot, a distance between the first and last items in the particular arrangement based on separation between the first unique feature and the second unique feature in the first output from the sensor, wherein measuring the distance is performed exclusive of information that is stored within a database and without the robot accessing the database;
   aiming the sensor at one item or two adjacent items in the particular arrangement;
   measuring, by operation of the robot, a size of a particular item in the particular arrangement based on second output from the sensor, wherein the second output comprises a dimension of the one item or a distance between unique features of the two adjacent items, wherein the particular item is one item from the plurality of items, and wherein measuring the size is performed exclusive of the information that is stored in the database and without the robot accessing the database; and tracking inventory of the plurality of items in the particular arrangement by deriving a number of items in the particular arrangement from the distance between the first and last items that is measured directly from the first sensor output, the size of the particular item, that is measured directly from the second sensor output, and exclusive of data that is stored in a database or another data source.

2. The method of claim 1, wherein aiming the sensor at the first and last items comprises operating the robot in positioning the sensor at one end of the particular arrangement of the plurality of items.

3. The method of claim 2, wherein generating the first output comprises firing a signal from the sensor to an opposite end of the particular arrangement.

4. The method of claim 1, wherein generating the first output comprises producing an image of the particular arrangement with a camera from the sensory array, and wherein measuring the distance comprises processing the image.

5. The method of claim 1, wherein aiming the sensor at the one item or the two adjacent items comprises retrieving the particular item from the particular arrangement with a retrieval arm of said robot, and wherein measuring the size comprises scanning the particular item independent of the particular arrangement with the sensor.

6. The method of claim 1, wherein the particular arrangement comprises the plurality of items arranged atop one another, beside one another, or from front to back.

7. The method of claim 1 further comprising moving the particular arrangement of items from a first location to a different second location with the robot in response to high demand for the particular item detected as a result of said tracking.

8. The method of claim 1, wherein aiming the sensor at the first and last items comprises repositioning the robot at an offset position from the first item in the particular arrangement, and wherein generating the first output comprises transmitting a first signal from the offset position to the first item and a second signal from the offset position to the last item.

9. The method of claim 1 further comprising detecting at least one gap of empty space between two items of the plurality of items in the particular arrangement, and decreasing the distance between the first and last items by a size of the at least one gap.

10. The method of claim 9, wherein detecting the at least one gap comprises projecting a structured light pattern from the robot onto the particular arrangement, and measuring a distance of the at least one gap based on an amount of deviation in the structured lighted pattern at a position corresponding to the at least one gap.

11. The method of claim 1, wherein measuring the distance between the first and last items in the particular arrangement comprises projecting a structured light pattern from the robot onto the particular arrangement, differentiating features of the structured light pattern on a particular plane from other planes, and determining the distance based on the features of the structured light on the particular plane spanning at least the distance between the first unique feature and the second unique feature.

12. The method of claim 1, wherein measuring the size of the particular item comprises determining irregular distances between two or more instances of a particular feature within the particular arrangement, and computing the size of the particular item based on a minimum distance between two instances of the particular feature.

13. The method of claim 1, wherein the first unique feature on the side of the first item is different than the second unique feature on the side of the second item based on the first item having a different orientation than the second item in the particular arrangement.

14. The method of claim 1, wherein said detecting comprises detecting that the first item has a different orientation than the last item in response to detecting the first unique feature on the side of the first item, detecting that the first unique feature is not a feature that repeats equidistantly along the particular arrangement, and identifying the second unique feature, that is different than the first unique feature, at a position of the last item.

15. The method of claim 1, wherein aiming the sensor of the sensory array at the first and last items comprises adjusting a position of the sensor to align with the first item in the particular arrangement, and orienting the sensor towards the last item in the particular arrangement.

16. A robot managing inventory in a site, the robot comprising:
  a motorized base positioning the robot before a plurality of units of an item organized according to a particular arrangement;
  a retrieval arm retrieving a particular unit off from the particular arrangement;
  a sensory array comprising at least one sensor obtaining (i) a first measure of distance separating a first unit and a last unit in the particular arrangement based on first output from the sensor that captures one end of the particular arrangement and an opposite end of the particular arrangement as a result of aiming the sensor at the first and last units in the particular arrangement prior to the retrieval arm retrieving the particular unit, and (ii) a different second measure corresponding to a size of the item based on second output resulting from aiming the sensor at the retrieval arm after retrieval of the particular unit off from the particular arrangement with the retrieval arm; and
  a processor dynamically tracking a count for a number of units in the particular arrangement from the first measure of distance, that is obtained directly from the first output of the sensor, the size of the item, that is obtained directly from the second output of the sensor, and exclusive of data that is stored in a database or another data source.

17. The robot of claim 16, wherein the sensory array obtains the first measure by firing a first signal to the opposite end of the particular arrangement and measuring a distance the first signal travels.

18. The robot of claim 16 further comprising an extendible arm imposing force on a frontmost item in a dispenser until the frontmost item position changes, wherein the sensory array measures (i) an amount of force imposed to change the frontmost item position or (ii) a distance the extendible arm extends into said dispenser.

19. The robot of claim 18, wherein the processor dynamically tracks a current count of an item in the dispenser based in part on one of the amount of force or the distance obtained using the extendible arm.

20. A device comprising:
  a sensory array; and
  one or more processors configured to:

aim a sensor of the sensory array at first and last items of a plurality of items in a particular arrangement;

detect a first unique feature about a side of the first item that is within the sensor field-of-view, and a second unique feature about a side of the last item that is within the sensor field-of-view based on first output from the sensor;

measure a distance between the first and last items in the particular arrangement based on separation between the first unique feature and the second unique feature in the first output from the sensor, wherein measuring the distance is performed exclusive of information that is stored within a database and without the device accessing the database;

aim the sensor at one item or two adjacent items in the particular arrangement;

measure a size of a particular item in the particular arrangement based on second output from the sensor, wherein the second output comprises a dimension of the one item or a distance between unique features of the two adjacent items, wherein the particular item is one item from the plurality of items, and wherein measuring the size is performed exclusive of the information that is stored in the database and without the device accessing the database; and track inventory of the plurality of items in the particular arrangement by deriving a number of items in the particular arrangement from the distance between the first and last items that is measured directly from the first sensor output, the size of the particular item, that is measured directly from the second sensor output, and exclusive of data that is stored in a database or another data source.

* * * * *